No. 798,865. PATENTED SEPT. 5, 1905.
S. R. BAILEY.
FRICTION NUT FOR AXLES.
APPLICATION FILED OCT. 28, 1904.

2 SHEETS—SHEET 1.

WITNESSES
A. T. Palmer
A. E. Palmer

INVENTOR
Samuel R. Bailey
BY Alban Andrew
ATTY.

No. 798,865. PATENTED SEPT. 5, 1905.
S. R. BAILEY.
FRICTION NUT FOR AXLES.
APPLICATION FILED OCT. 28, 1904.

2 SHEETS—SHEET 2.

UNITED STATES PATENT OFFICE.

SAMUEL R. BAILEY, OF AMESBURY, MASSACHUSETTS.

FRICTION-NUT FOR AXLES.

No. 798,865.  Specification of Letters Patent.  Patented Sept. 5, 1905.

Application filed October 28, 1904. Serial No. 230,389.

*To all whom it may concern:*

Be it known that I, SAMUEL R. BAILEY, a citizen of the United States, and a resident of Amesbury, in the county of Essex and State of Massachusetts, have invented certain new and useful Improvements in Friction-Nuts for Axles, &c., of which the following is a specification.

This invention relates to improvements in adjustable friction-nuts especially adapted for use on carriage-axles or for other purposes where it is desired to adjust the position of the nut relative to the axle or spindle end and to secure such nut in its adjusted position without the employment of check-nuts and to prevent rattling, as will hereinafter be more fully shown and described, reference being had to the accompanying drawings, wherein—

Figure 1:
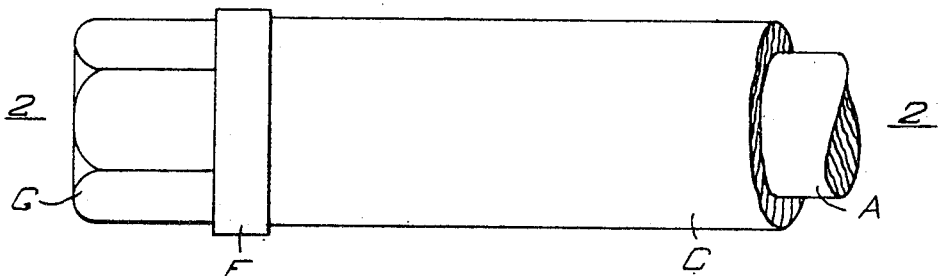
Figure 2:
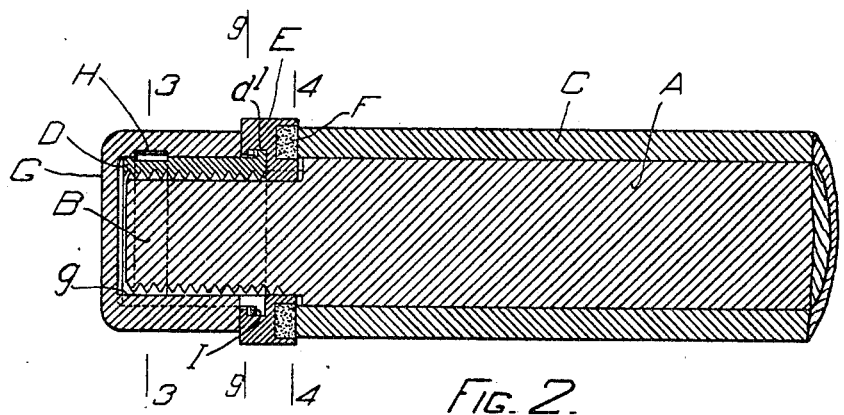
Figure 3:
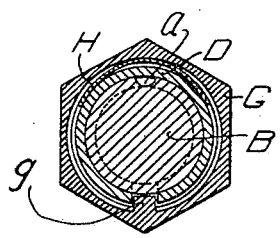
Figure 4:
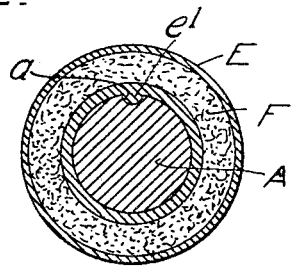
Figure 5:
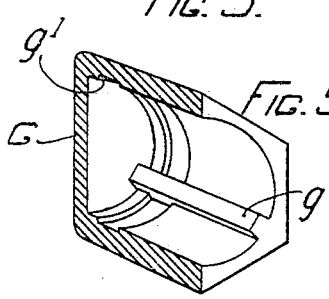
Figure 6:
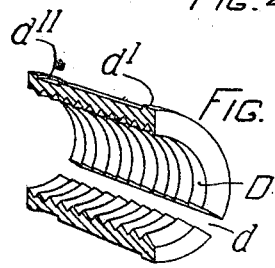
Figure 7:
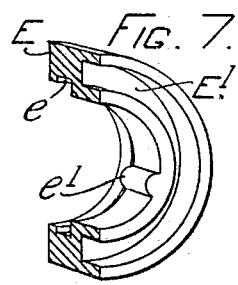
Figure 8:
Figure 9:
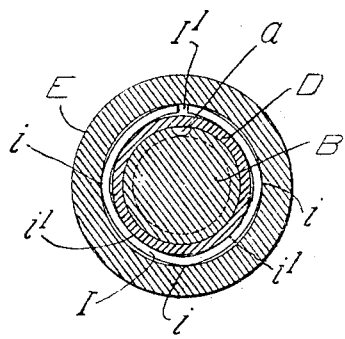
Figure 10:
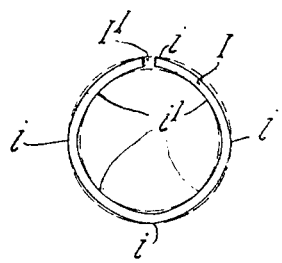
Figure 11:
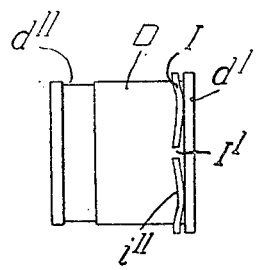

Figure 1 is a side elevation of the invention. Fig. 2 is a longitudinal section on the line 2 2 shown in Fig. 1. Fig. 3 is a cross-section on the line 3 3 shown in Fig. 2. Fig. 4 is a cross-section on the line 4 4 shown in Fig. 2. Fig. 5 is a sectional perspective view of the hollow shell or wrench-head in which the expansive slitted nut is contained. Fig. 6 is a similar perspective view of the said slitted nut adapted to engage the screw-threaded end of the axle. Fig. 7 is a similar perspective view of the non-rotating washer loosely journaled to the inner end of slitted nut. Fig. 8 is a detail perspective view of the elliptic spring for holding the nut connected to the interior of the hollow wrench head or case. Fig. 9 is a cross-section on the line 9 9 in Fig. 2. Fig. 10 is a side view of a take-up spring to prevent lost motion to be hereinafter described; and Fig. 11 is a detail side elevation of the nut and said take-up spring attached.

Similar letters refer to similar parts wherever they occur on the different parts of the drawings.

In the drawings, A represents an axle or spindle having its outer end screw-threaded, as shown at B in Fig. 2.

C is the axle-box, in which the axle A is journaled, as usual.

D is an internally-screw-threaded nut adapted to engage the screw-threaded end of the axle. Said nut is longitudinally slitted at $d$, as shown in detail in Fig. 6. The said nut has on its exterior an annular projection $d'$, adapted to be compressed and sprung into an annular groove $e$ on the outer end of the non-rotating washer E, which latter is shown in detail in Fig. 7. The said washer has on its interior a projection or flat surface $e'$, adapted to engage a correspondingly-shaped recess $a$ on the axle A, so as to hold said washer connected to the axle and prevented from rotation thereon.

In the inner end of the non-rotating washer E is made an annular groove $E'$, in which is located an annular cushion or washer F, normally held in contact with the outer end of the axle-box C, as shown in Fig. 2. Said cushion F may be made of leather or other suitable elastic or yielding material, or, if so desired, it may be made in the form of a coiled or elastic spring, as may be most practical and desirable. Said elastic cushion serves to take up the end thrust of the axle-box relative to the axle-nut, so as to prevent rattling caused by the wear of the adjacent parts or otherwise.

G is the hollow wrench head or cap within which the slitted nut is held, and for such purpose a longitudinal spline $g$ is made on the interior of said cap, which engages the slit $d$ in the nut D, as shown in Fig. 3, so as to cause the nut to turn with said cap when the latter is turned around its axis during the adjustment of the nut relative to the screw-threaded end of the axle. It is also essential that the cap G should be held from longitudinal motion on the nut, so as to prevent said cap from getting detached from the nut, and for this purpose I make on the outer end of the said nut an annular groove $d''$, coinciding with a corresponding groove $g'$ on the internal portion of said cap, as shown in Fig. 3, and in said grooves I interpose, preferably, a yielding half-elliptic spring H. (Shown in detail in Fig. 8 and assembled in Figs. 2 and 3.) The cap G is preferably polygonally shaped on its outside, so that it can readily be turned by means of a suitable wrench or spanner.

In using the device the inner end of the slitted nut is loosely connected to the non-rotating washer E, which is done by compressing said nut sufficiently to cause its lip $d'$ to be sprung into the groove $e$ on the said washer E, after which the nut D is located within the cap G, with the spline $g$ and slit $d$ loosely interlocking, so as to cause the nut to rotate by the rotation of the said cap. It is obvious that by turning the cap in either direction the engagement of the spline $g$ with the slit $d$ in the nut D causes the latter to expand to relieve the friction between nut and axle. Previous to locating the nut within said cap they are connected by means of the spring H, fitting the grooves $d''$ $g'$, so as to prevent the cap from being disconnected from the nut and also to prevent the cap from rattling on the nut. When the parts are thus assembled, the nut is screwed on the screw-threaded axle end simply by turning the cap G by the application of a wrench or spanner, causing the non-rotating washer E, with its cushion F, to be held with proper friction against the end of the axle-box C.

In practice for the purpose of preventing rattling between the nut D and non-rotating washer E and frictionally holding said parts together I interpose between said parts a bent or irregularly-shaped spring-washer I, said spring having two irregularities in conformation, one for the purpose of taking up circumferential lost motion between the nut D and washer E, said irregularity consisting of a plurality of high points $i$ and low points $i'$ for contact respectively with the non-rotating washer E and nut D. (Shown in full lines in Fig. 9 and dotted lines in Fig. 10.) The other irregularity consists of a plurality of lateral curvatures, as shown at $i''$ in Fig. 11, having contact laterally between the flange $d'$ of the nut D and the outer wall of the groove $e$ of the non-rotating washer E. The slit I' in the spring-washer I provides for compression on the plane of both irregularities. Said spring-washer I serves to hold the nut D against the inner wall of the groove $e$ in the non-rotating washer E as well as to form a yielding support peripherally between said nut and washer, thus preventing rattling.

What I wish to secure by Letters Patent and claim is—

1. The herein-described adjustable axle-nut device, consisting in combination of an axle-box, an axle screw-threaded on its outer end, an internally-screw-threaded slitted nut engaging said axle end, a non-rotating washer loosely connected to said nut and a hollow wrench-head surrounding said nut and connected to it substantially as and for the purpose set forth.

2. The herein-described adjustable axle-nut device, consisting of an axle-box, a screw-threaded axle journaled in the former, an internally-screw-threaded slitted nut engaging said screw-thread on the axle, a non-rotating washer loosely connected to said nut and a hollow wrench-head attached to and rotating with said nut substantially as and for the purpose set forth.

3. The herein-described adjustable axle-nut device, consisting of an axle-box, a screw-threaded axle journaled therein, a non-rotating washer connected to said axle and having a cushion intermediate said washer and axle-box, a slitted screw-threaded nut loosely connected to said non-rotating washer and a hollow wrench-head surrounding said nut and connected to it so as to cause said nut to rotate by the adjustment of said wrench-head and means for longitudinally connecting said nut and wrench-head, substantially as and for the purpose set forth.

4. The herein-described adjustable axle-nut device, consisting in combination, of a slitted nut engaging the screw-threaded axle and a non-rotating washer loosely connected to said nut, and a cap engaging said slitted nut, and a yielding spring located in a groove in the said cap and a corresponding groove on the exterior of the nut, substantially as set forth.

5. A washer having an internal annular groove in combination with a yielding sleeve having an annular flange on its exterior journaled in the groove of said washer, and a yielding, irregular-faced washer arranged within said annular groove intermediate the first-mentioned washer and the flange of said sleeve and adapted to bear against the internal walls of said grooved washer, the sleeve and its flange journaled therein for the purpose of preventing rattling between said grooved washer and flanged sleeve, and frictionally holding said parts together, substantially as described.

6. The herein-described axle-nut device, consisting of an axle-box, a screw-threaded axle journaled therein in combination with a non-rotating washer, a flanged slitted nut engaging the screw-threaded axle end and journaled in said non-rotating washer, and an irregularly-shaped spring arranged intermediate said nut-flange and the groove in the non-rotating washer substantially as set forth.

7. The herein-described axle-nut device, consisting of an axle-box, an axle journaled therein and having a screw-threaded end, a flanged slitted nut engaging the latter, a non-rotating washer arranged intermediate the nut and axle-box, and an antirattler-spring I, arranged in the groove of the non-rotating washer between the nut-flange and the outer wall of said groove, for the purpose set forth.

In testimony whereof I have affixed my signature in presence of two witnesses.

SAMUEL R. BAILEY.

Witnesses:
 JAMES B. GARDNER,
 ALBAN ANDRÉN.